US007146808B2

(12) United States Patent
Devier et al.

(10) Patent No.: US 7,146,808 B2
(45) Date of Patent: Dec. 12, 2006

(54) HYDRAULIC SYSTEM HAVING PRIORITY BASED FLOW CONTROL

(75) Inventors: Lonnie J. Devier, Channahon, IL (US); Shoji Tozawa, Kobe (JP); Michael T. Verkuilen, Metamora, IL (US)

(73) Assignees: Caterpillar Inc, Peoria, IL (US); Shin Caterpillar Mitsubishi Ltd (JP)

( * ) Notice: Subject to any disclaimer, the term of this patent is extended or adjusted under 35 U.S.C. 154(b) by 29 days.

(21) Appl. No.: 10/975,418

(22) Filed: Oct. 29, 2004

(65) Prior Publication Data

US 2006/0090459 A1 May 4, 2006

(51) Int. Cl.
*F16D 31/02* (2006.01)
(52) U.S. Cl. .......................................... 60/422; 60/459
(58) Field of Classification Search .................. 60/422, 60/459, 445
See application file for complete search history.

(56) References Cited

U.S. PATENT DOCUMENTS

| | | | | |
|---|---|---|---|---|
| 3,366,202 | A | | 1/1968 | James |
| 4,046,270 | A | | 9/1977 | Baron et al. |
| 4,222,409 | A | | 9/1980 | Budzich |
| 4,250,794 | A | | 2/1981 | Haak et al. |
| 4,416,187 | A | | 11/1983 | Nystrom |
| 4,437,307 | A | | 3/1984 | Budzich |
| 4,437,385 | A | | 3/1984 | Kramer et al. |
| 4,480,527 | A | | 11/1984 | Lonnemo |
| 4,581,893 | A | | 4/1986 | Lindbom |
| 4,586,330 | A | | 5/1986 | Watanabe et al. |
| 4,623,118 | A | | 11/1986 | Kumar |
| 4,662,601 | A | | 5/1987 | Andersson |
| 4,706,932 | A | | 11/1987 | Yoshida et al. |
| 4,712,376 | A | | 12/1987 | Hadank et al. |
| 4,747,335 | A | | 5/1988 | Budzich |
| 4,799,420 | A | | 1/1989 | Budzich |
| 5,029,067 | A | * | 7/1991 | Nishida et al. ............... 60/421 |
| 5,152,142 | A | | 10/1992 | Budzich |
| 5,167,121 | A | * | 12/1992 | Sepehri et al. ................ 60/422 |
| 5,182,908 | A | * | 2/1993 | Devier et al. ................. 60/420 |
| 5,211,196 | A | | 5/1993 | Schwelm |
| 5,287,794 | A | | 2/1994 | Andersson |
| 5,297,381 | A | | 3/1994 | Eich et al. |
| 5,313,873 | A | | 5/1994 | Gall et al. |
| 5,350,152 | A | | 9/1994 | Hutchison et al. |

(Continued)

FOREIGN PATENT DOCUMENTS

JP 02613041 B2 5/1997

*Primary Examiner*—Thomas E. Lazo
(74) *Attorney, Agent, or Firm*—Finnegan, Henderson, Farabow, Garrett & Dunner

(57) ABSTRACT

A hydraulic system has a source, a plurality of fluid actuators, and a controller. The controller is configured to receive an input indicative of which of the plurality of fluid actuators are a first and a second type of fluid actuator, to receive an input indicative of a desired flow rate for the plurality of fluid actuators, and to determine a current flow rate of the source. The controller is further configured to demand the desired flow rate for the first type of fluid actuator and to demand a scaled down desired flow rate for the second type of fluid actuator when a total desired flow rate exceeds the current flow rate of the source, and to demand a scaled down desired flow rate for all of the plurality of fluid actuators when the desired flow rate for the first type of fluid actuator exceeds the current flow rate of the source.

29 Claims, 3 Drawing Sheets

U.S. PATENT DOCUMENTS

| | | | |
|---|---|---|---|
| 5,366,202 A | 11/1994 | Lunzman | |
| 5,477,677 A | 12/1995 | Krnavek | |
| 5,490,384 A | 2/1996 | Lunzman | |
| 5,537,818 A | 7/1996 | Hosseini et al. | |
| 5,553,452 A | 9/1996 | Snow et al. | |
| 5,560,387 A | 10/1996 | Devier et al. | |
| 5,568,759 A | 10/1996 | Aardema | |
| 5,678,470 A | 10/1997 | Koehler et al. | |
| 5,813,226 A | 9/1998 | Krone | |
| 5,868,059 A | 2/1999 | Smith | |
| 5,880,957 A | 3/1999 | Aardema et al. | |
| 5,947,140 A | 9/1999 | Aardema et al. | |
| 5,960,695 A | 10/1999 | Aardema et al. | |
| 6,009,708 A | 1/2000 | Miki et al. | |
| 6,216,456 B1 | 4/2001 | Mitchell | |
| 6,282,891 B1 | 9/2001 | Rockwood | |
| 6,321,152 B1 * | 11/2001 | Amborski et al. | 60/422 |
| 6,467,264 B1 | 10/2002 | Stephenson et al. | |
| 6,498,973 B1 | 12/2002 | Dix et al. | |
| 6,502,393 B1 | 1/2003 | Stephenson et al. | |
| 6,502,500 B1 | 1/2003 | Yoshino | |
| 6,522,964 B1 | 2/2003 | Miki et al. | |
| 6,598,391 B1 | 7/2003 | Lunzman et al. | |
| 6,619,183 B1 | 9/2003 | Yoshino | |
| 6,655,136 B1 | 12/2003 | Holt et al. | |
| 6,662,705 B1 | 12/2003 | Huang et al. | |
| 6,691,603 B1 | 2/2004 | Linerode et al. | |
| 6,694,860 B1 | 2/2004 | Yoshino | |
| 6,715,402 B1 | 4/2004 | Pfaff et al. | |
| 6,718,759 B1 | 4/2004 | Tabor | |
| 6,725,131 B1 | 4/2004 | Lunzman | |
| 6,732,512 B1 | 5/2004 | Pfaff et al. | |
| 6,748,738 B1 | 6/2004 | Smith | |
| 6,761,029 B1 | 7/2004 | Linerode | |
| 2003/0005820 A1 | 1/2003 | Hudson et al. | |
| 2003/0196434 A1 | 10/2003 | Brown et al. | |

* cited by examiner

HYDRAULIC SYSTEM HAVING PRIORITY BASED FLOW CONTROL

TECHNICAL FIELD

The present disclosure relates generally to a hydraulic system, and more particularly, to a hydraulic system having flow control based on priority.

BACKGROUND

Work machines such as, for example, dozers, loaders, excavators, motor graders, and other types of heavy machinery use multiple hydraulic actuators to accomplish a variety of tasks. These actuators are fluidly connected to a pump on the work machine that provides pressurized fluid to chambers within the various actuators in response to operator demand. During simultaneous manipulation of the multiple actuators, it may be possible for the operator to demand fluid flow at a greater rate than the flow capacity of the pump. When a flow of fluid supplied to one of the actuators is less than demanded, that particular actuator may not respond as expected, possibly resulting in inefficient operation and/or undesired movements of the work machine.

One method of accommodating a demand for fluid flow that is greater than the capacity of an associated pump is described in U.S. Pat. No. 6,498,973 (the '973 patent) issued to Dix et al. on Dec. 24, 2002. The '973 patent describes a valve control system for a work vehicle. The valve control system includes a plurality of actuators fluidly connected to a pump. One or more of the actuators within the valve control system may be classified as a priority flow rate actuator, while the remaining actuators within the valve control system may be classified as scaled flow rate actuators. When a situation arises where a total flow rate demanded by a work machine operator for all of the actuators exceeds the pump's total flow capacity, the valve control system proportionately scales the flow supplied to the scaled flow rate actuators such that the scaled down total demanded flow rate remains within the total flow capacity of the pump. Specifically, the demanded flow rate of the priority flow rate actuators is subtracted from the maximum flow capacity of the pump to determine a flow rate available for the scaled flow rate actuators. This calculated flow rate available for the scaled flow rate actuators is then proportionately divided amongst the scaled flow rate actuators.

Although the valve control system of the '973 patent may accommodate situations where the combined flow rate demanded from priority and scaled flow rate actuators exceeds the flow capacity of the pump, the valve control system does not accommodate situations where the flow rate demanded from just the priority flow rate actuators exceeds the pumps total flow capacity. In addition, the valve control system of the '973 patent does not accommodate situations where all of the actuators are priority flow rate actuators or when importance is placed on which of the scaled flow rate actuators receive a greater portion of the remaining flow rate.

The disclosed hydraulic system is directed to overcoming one or more of the problems set forth above.

SUMMARY OF THE INVENTION

In one aspect, the present disclosure is directed to a hydraulic system. The hydraulic system includes a tank configured to hold a supply of fluid and a source configured to pressurize the fluid. The hydraulic system also includes a plurality of fluid actuators configured to receive the pressurized fluid and a controller. The controller is configured to receive an input indicative of which of the plurality of fluid actuators are a first type of fluid actuator and which of the plurality of fluid actuators are a second type of fluid actuator. The controller is also configured to receive an input indicative of a desired flow rate for the plurality of fluid actuators and to determine a current flow rate of the source. The controller is further configured to demand the desired flow rate for the first type of fluid actuator and to demand a scaled down desired flow rate of the second type of fluid actuator when a total desired flow rate for the plurality of fluid actuators exceeds the current flow rate of the source. The controller is additionally configured to demand a scaled down desired flow rate for all of the plurality of fluid actuators when the desired flow rate for the first type of fluid actuator exceeds the current flow rate of the source.

In another aspect, the present disclosure is directed to a method of operating a hydraulic system. The method includes pressurizing a fluid and directing the pressurized fluid to a plurality of fluid actuators. The method also includes receiving an input indicative of which of the plurality of fluid actuators are a first type of fluid actuator and which of the plurality of fluid actuators are a second type of fluid actuator. The method further includes receiving an input indicative of a desired flow for the plurality of fluid actuators and determining a current flow rate of a source in fluid communication with the plurality of fluid actuators. The method additionally includes demanding the desired flow rate for the first type of fluid actuator and demanding a scaled down desired flow rate of the second type of fluid actuator when a total desired flow rate for the plurality of fluid actuators exceeds the current flow rate of the source, and demanding a scaled down desired flow rate for all of the plurality of fluid actuators when the desired flow rate for the first type of fluid actuator exceeds the current flow rate of the source.

DETAILED DESCRIPTION

Figure 1:
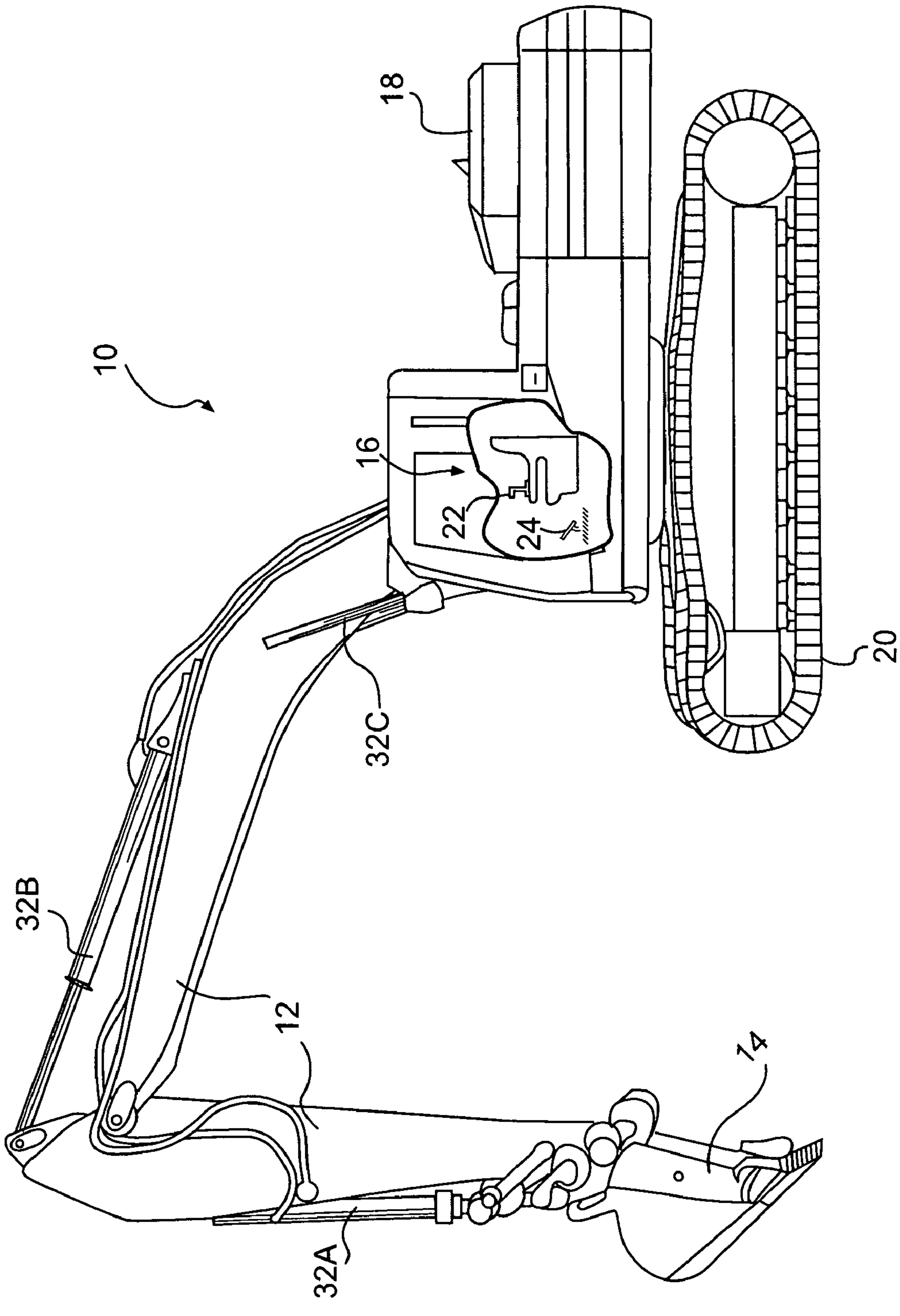
FIG. 1 is a side-view diagrammatic illustration of an exemplary disclosed work machine.

FIG. 1 illustrates an exemplary work machine 10. Work machine 10 may be a fixed or mobile machine that performs some type of operation associated with an industry such as mining, construction, farming, transportation, or any other industry known in the art. For example, work machine 10 may be an earth moving machine such as an excavator, a dozer, a loader, a backhoe, a motor grader, a dump truck, or any other earth moving machine. Work machine 10 may include a frame 12, at least one work implement 14, an operator interface 16, a power source 18, and at least one traction device 20.

Frame 12 may include any structural unit that supports movement of work machine 10 and/or work implement 14. Frame 12 may be, for example, a stationary base frame connecting power source 18 to traction device 20, a movable frame member of a linkage system, or any other frame known in the art.

Work implement 14 may include any device used in the performance of a task. For example, work implement 14 may include a bucket, a blade, a shovel, a ripper, a dump bed, a hammer, an auger, or any other suitable task-performing device. Work implement 14 may be configured to pivot, rotate, slide, swing, or move relative to frame 12 in any other manner known in the art.

Operator interface 16 may be configured to receive input from a work machine operator indicative of a desired work machine movement. It is contemplated that the input could alternately be a computer generated command from an automated system that assists the operator or an autonomous system that operates in place of the operator. Specifically, operator interface 16 may include a first operator interface device 22 and a second operator interface device 24. First operator interface device 22 may include a multi-axis joystick located to one side of an operator station. First operator interface device 22 may be a proportional-type controller configured to position and/or orient work implement 14, wherein a movement speed of work implement 14 is related to an actuation position of first operator interface device 22 about an actuation axis. Second operator interface device 24 may include a throttle pedal configured for actuation by an operator's foot. Second operator interface device 24 may also be a proportional-type controller configured to control a driving rotation of traction device 20, wherein a rotational speed of traction device 20 is related to an actuation position of second operator interface device 24. It is contemplated that additional and/or different operator interface devices may be included within operator interface 16 such as, for example, wheels, knobs, push-pull devices, switches, and other operator interface devices known in the art.

Power source 18 may be an engine such as, for example, a diesel engine, a gasoline engine, a natural gas engine, or any other engine known in the art. It is contemplated that power source 18 may alternately be another source of power such as a fuel cell, a power storage device, and electric motor, or another source of power known in the art.

Traction device 20 may include tracks located on each side of work machine 10 (only one side shown). Alternately, traction device 20 may include wheels, belts, or other traction devices. Traction device 20 may or may not be steerable.

Figure 2:
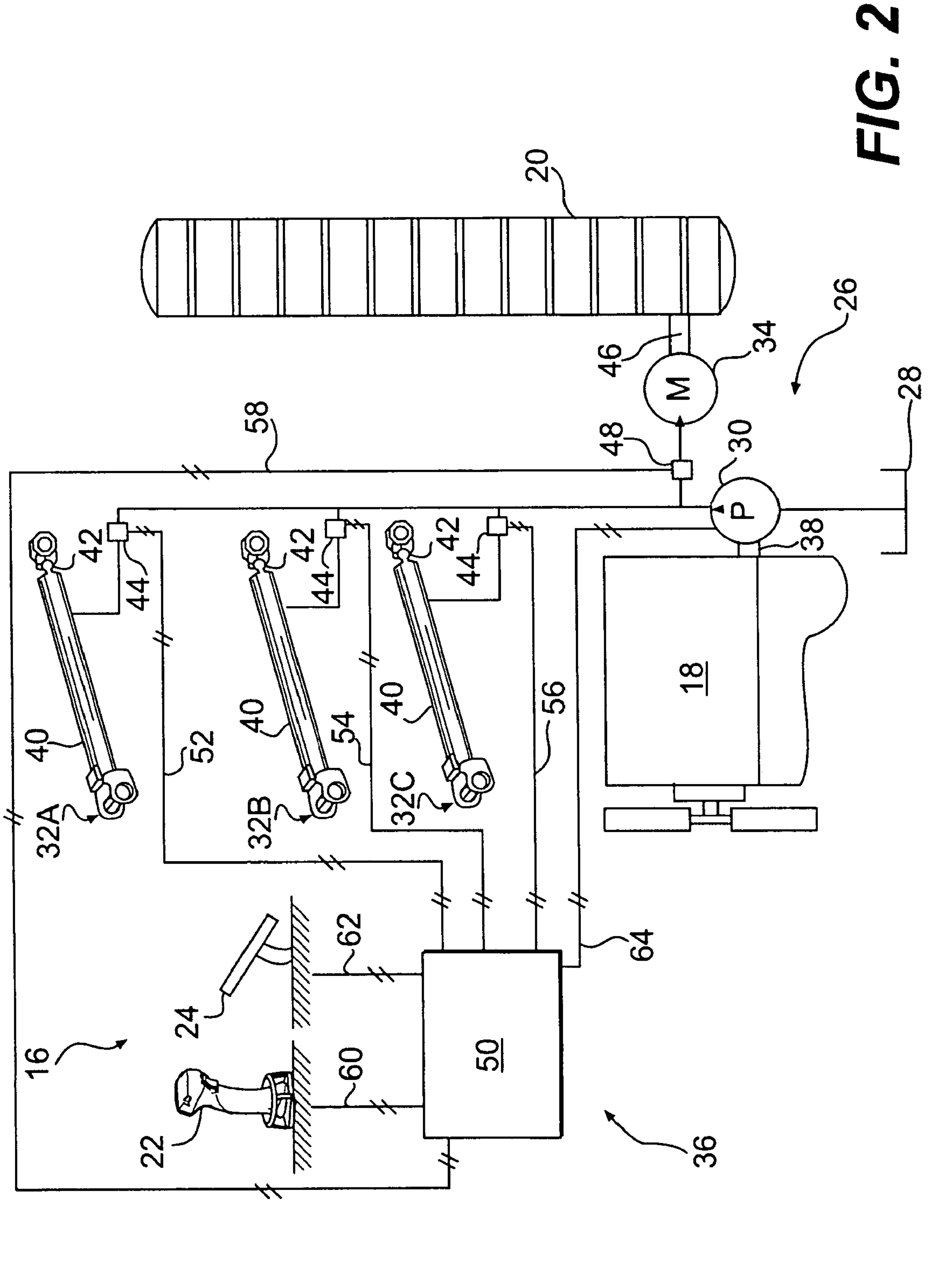
FIG. 2 is a schematic illustration of an exemplary disclosed hydraulic system for the work machine of FIG. 1.

As illustrated in FIG. 2, work machine 10 may include a hydraulic system 26 having a plurality of fluid components that cooperate together to move work implement 14 and/or to propel work machine 10. Specifically, hydraulic system 26 may include a tank 28 holding a supply of fluid, a source 30 configured to pressurize the fluid and to direct the pressurized fluid to one or more hydraulic cylinders 32*a–c*, to one or more fluid motors 34, and/or to any other additional fluid actuator known in the art. Hydraulic system 26 may also include a control system 36 in communication with the fluid components of hydraulic system 26. It is contemplated that hydraulic system 26 may include additional and/or different components such as, for example, accumulators, restrictive orifices, check valves, pressure relief valves, makeup valves, pressure-balancing passageways, and other components known in the art.

Tank 28 may constitute a reservoir configured to hold a supply of fluid. The fluid may include, for example, a dedicated hydraulic oil, an engine lubrication oil, a transmission lubrication oil, or any other fluid known in the art. One or more hydraulic systems within work machine 10 may draw fluid from and return fluid to tank 28. It is also contemplated that hydraulic system 26 may be connected to multiple separate fluid tanks.

Source 30 may be configured to produce a flow of pressurized fluid and may include a pump such as, for example, a variable displacement pump, a fixed displacement pump, a variable delivery pump, or any other source of pressurized fluid known in the art. Source 30 may be drivably connected to power source 18 of work machine 10 by, for example, a countershaft 38, a belt (not shown), an electrical circuit (not shown), or in any other suitable manner. Alternately, source 30 may be indirectly connected to power source 18 via a torque converter, a gear box, or in any other appropriate manner. It is contemplated that multiple sources of pressurized fluid may be interconnected to supply pressurized fluid to hydraulic system 26.

A flow rate available from source 30 may be determined by sensing an angle of a swashplate within source 30 or by observing an actual command sent to source 30. It is contemplated that the flow rate available from source 30 may alternately be determined by a sensing device configured to determine an actual flow output from source 30. A flow rate available from source 30 may be reduced or increased for various reasons such as, for example, to lower a displacement to ensure that demanded pump power does not exceed available input (power source) power at high pump pressures, or to reduced or increase pressures within hydraulic system 26.

Hydraulic cylinders 32*a–c* may connect work implement 14 to frame 12 via a direct pivot, via a linkage system with each of hydraulic cylinders 32*a–c* forming one member in the linkage system (referring to FIG. 1), or in any other appropriate manner. Each of hydraulic cylinders 32*a–c* may include a tube 40 and a piston assembly (not shown) disposed within tube 40. One of tube 40 and the piston assembly may be pivotally connected to frame 12, while the other of tube 40 and the piston assembly may be pivotally connected to work implement 14. It is contemplated that tube 40 and/or the piston assembly may alternately be fixedly connected to either frame 12 or work implement 14 or connected between two or more members of frame 12. Each of hydraulic cylinders 32*a–c* may include a first chamber (not shown) and a second chamber (not shown) separated by the piston assembly. The first and second chambers may be selectively supplied with a pressurized fluid and drained of the pressurized fluid to cause the piston assembly to displace within tube 40, thereby changing the effective length of hydraulic cylinders 32*a–c*. The expansion and retraction of hydraulic cylinders 32*a–c* may function to assist in moving work implement 14.

The piston assembly may include a piston (not shown) axially aligned with and disposed within tube 40, and a piston rod 42 connectable to one of frame 12 and work implement 14 (referring to FIG. 1). The piston may include two opposing hydraulic surfaces, one associated with each of the first and second chambers. An imbalance of fluid pressure on the two surfaces may cause the piston assembly to axially move within tube 40. For example, a fluid pressure within the first hydraulic chamber acting on a first hydraulic surface being greater than a fluid pressure within the second hydraulic chamber acting on a second opposing hydraulic surface may cause the piston assembly to displace to increase the effective length of hydraulic cylinders 32*a–c*. Similarly, when a fluid pressure acting on the second hydraulic surface is greater than a fluid pressure acting on the first hydraulic surface, the piston assembly may retract within tube 40 to decrease the effective length of hydraulic cylinders 32*a–c*. A sealing member (not shown), such as an o-ring, may be connected to the piston to restrict a flow of fluid between an internal wall of tube 40 and an outer cylindrical surface of the piston.

Each of hydraulic cylinders 32*a–c* may include at least one proportional control valve 44 that functions to meter pressurized fluid from source 30 to one of the first and second hydraulic chambers, and at least one drain valve (not shown) that functions to allow fluid from the other of the first and second chambers to drain to tank 28. Specifically, proportional control valve 44 may include a spring biased proportional valve mechanism that is solenoid actuated and configured to move between a first position at which fluid is allowed to flow into one of the first and second chambers and a second position at which fluid flow is blocked from the first and second chambers. The location of the valve mechanism between the first and second positions may determine a flow rate of the pressurized fluid directed into the associated first and second chambers. The valve mechanism may be movable between the first and second positions in response to a demanded flow rate that produces a desired movement of work implement 14. The drain valve may include a spring biased valve mechanism that is solenoid actuated and configured to move between a first position at which fluid is allowed to flow from the first and second chambers and a second position at which fluid is blocked from flowing from the first and second chambers. It is contemplated that proportional control valve 44 and the drain valve may alternately be hydraulically actuated, mechanically actuated, pneumatically actuated, or actuated in any other suitable manner.

Motor 34 may be a variable displacement motor or a fixed displacement motor and may be configured to receive a flow of pressurized fluid from source 30. The flow of pressurized fluid through motor 34 may cause an output shaft 46 connected to traction device 20 to rotate, thereby propelling and/or steering work machine 10. It is contemplated that motor 34 may alternately be indirectly connected to traction device 20 via a gear box or in any other manner known in the art. It is further contemplated that motor 34 may be connected to a different mechanism on work machine 10 other than traction device 20 such as, for example a rotating work implement, a steering mechanism, or any other work machine mechanism known in the art. Motor 34 may include a proportional control valve 48 that controls a flow rate of the pressurized fluid supplied to motor 34. Proportional control valve 48 may include a spring biased proportional valve mechanism that is solenoid actuated and configured to move between a first position at which fluid is allowed to flow through motor 34 and a second position at which fluid flow is blocked from motor 34. The location of the valve mechanism between the first and second positions may determine a flow rate of the pressurized fluid directed through motor 34. The valve mechanism may be movable between the first and second positions in response to a demanded flow rate that produces a desired rotational movement of traction device 20.

Control system 36 may include a controller 50. Controller 50 may be embodied in a single microprocessor or multiple microprocessors that include a means for controlling an operation of hydraulic system 26. Numerous commercially available microprocessors can be configured to perform the functions of controller 50. It should be appreciated that controller 50 could readily be embodied in a general work machine microprocessor capable of controlling numerous work machine functions. Controller 50 may include a memory, a secondary storage device, a processor, and any other components for running an application. Various other circuits may be associated with controller 50 such as power supply circuitry, signal conditioning circuitry, solenoid driver circuitry, and other types of circuitry.

Controller 50 may be configured to receive input from operator interface 16 and to control the flow rate of pressurized fluid to hydraulic cylinders 32*a–c* and motor 34 in response to the input. Specifically, controller 50 may be in communication with proportional control valves 44 of hydraulic cylinders 32*a–c* via communication lines 52, 54, and 56 respectively, with proportional control valve 48 of motor 34 via a communication line 58, with first operator interface device 22 via a communication line 60, and with second operator interface device 24 via a communication line 62. Controller 50 may receive the proportional signals generated by first operator interface device 22 and selectively actuate one or more of proportional control valves 44 to selectively fill the first or second actuating chambers associated with hydraulic cylinders 32*a–c* to produce the desired work tool movement. Controller 50 may also receive the proportional signal generated by second operator interface device 24 and selectively actuate proportional control valve 48 of motor 34 to produce the desired rotational movement of traction device 20.

Controller 50 may be in communication with source 30 via a communication line 64 and configured to change operation of source 30 in response to a demand for pressurized fluid. Specifically, controller 50 may be configured to determine a desired flow rate of pressurized fluid that is required to produce work machine movements desired by a work machine operator (total desired flow rate) and indicated via first and/or second operator interface devices 22, 24. Controller 50 may be further configured to determine a current flow rate of source 30 and a maximum flow capacity of source 30. Controller 50 may be configured to increase the current flow rate of source 30 if the total desired flow rate is greater than the current flow rate and the current flow rate is less than the maximum flow capacity of source 30.

Controller 50 may also be configured to demand a reduced desired flow rate of pressurized fluid to hydraulic cylinders 32*a–c* and/or motor 34 when a current flow rate and/or the maximum flow capacity of source 30 is less than the total desired flow rate. In particular, there may be instances when the total desired flow rate may exceed the current flow rate and/or the flow capacity of source 30. In these situations, if the total demanded flow rate was not reduced from the total desired flow rate, one or more of hydraulic cylinders 32*a–c* and/or motor 34 might not receive an adequate flow of pressurized fluid and the associated movements of work machine 10 could be unpredictable. This unpredictability could result in lack of response of work machine 10 and/or produce unexpected work machine movements. When controller 50 determines that the total desired flow rate is more than the current flow rate of source 30, the demanded flow rate for one or more of hydraulic cylinders 32*a–c* and/or motor 34 may be reduced from the total desired flow rate by moving the associated proportional control valves 44, 48 towards the second position. During operation of work machine 10, some flow of pressurized fluid may always be available to each of hydraulic cylinders 32*a–c* and motor 34 in response to an input received via operator interface 16, thereby providing responsive and predictable work machine and work implement movement.

The manner in which these demanded flow rates are reduced may be determined by a work machine operator. In one example, an operator may designate one or more of hydraulic cylinders 32*a–c* and motor 34 as a high-priority actuator and the remaining ones of hydraulic cylinders 32*a–c* and motor 34 as low-priority actuators. In the situation described above, where the total desired flow rate is more than the current flow rate of source 30, the flow rate demanded for the high-priority actuator(s) may be fully apportioned, while the flow rate demanded for the low-priority actuators may be reduced from the originally desired flow rate. Specifically, controller 50 may determine a current flow rate and the total desired flow rate from all of the high- and low-priority actuators. If the total desired flow rate is less than the current flow rate, the total desired flow rate may be fully demanded and provided to the actuator. However, if the total desired flow rate exceeds the current flow rate of source 30, the flow rate demanded for the high-priority actuator(s) may first be fully apportioned. The remaining current flow rate may then be apportioned to the low-priority actuators at flow rates that are less than the originally desired flow rates, such that the total demanded flow rate for both the high- and low-priority actuators does not exceed the current flow rate of source 30.

The manner in which the demanded flow rate for the low-priority actuators is reduced may also be designated by a work machine operator. In particular, a work machine operator may determine a subset of priorities to affect how the remaining flow rate is to be apportioned among the low-priority actuators. For example, a work machine operator may determine that it is important for a first low-priority actuator to receive a greater portion of the remaining flow rate than a second low-priority actuator and consequently may assign a higher priority value to the first low-priority actuator. The current flow rate remaining after the high-priority actuators have been apportioned their demanded flow rates may then be apportioned among the low-priority actuators according to the subset of operator-assigned priorities. It is contemplated that a person other than the machine operator may assign the priorities such as, for example, a service technician, a work machine owner, a work site operator, a manufacturer, or any other appropriate person.

There may be instances when the flow rate desired for the high-priority actuators alone exceeds the current flow rate of source 30. In these situations, the demanded flow rate for both the high- and low-priority actuators may be reduced such that the total demanded flow rate does not exceed the current flow rate available from source 30. When the demanded flow rate for all of the actuators, high- and low-priority actuators, must be reduced below the originally desired flow rate, controller 50 may determine a new priority ranking for just the high-priority actuators or, alternately, for each of the actuators based on the subset of operator assigned priorities for the low-scale actuators and the designation of either being a high- or low-priority actuator. For example, controller 50 may determine a single identical priority value for each of the high-priority actuators that is greater than any one priority value assigned by the operator or newly determined for the low-priority actuators. Alternately, controller 50 may determine a new unique priority value for each of the high-priority actuators, the new unique priority values for the high-priority actuators being greater than the any one priority value assigned by the operator or newly determined for the low-priority actuators. Controller 50 may then reduce the demanded flow rate of all of the actuators according to the new determined priorities such that the total demanded flow rate does not exceed the current flow rate available from source 30 and each of the actuators receives a portion of the originally-desired flow rate according to the operator's assigned priority and high- or low-priority designation.

Figure 3:
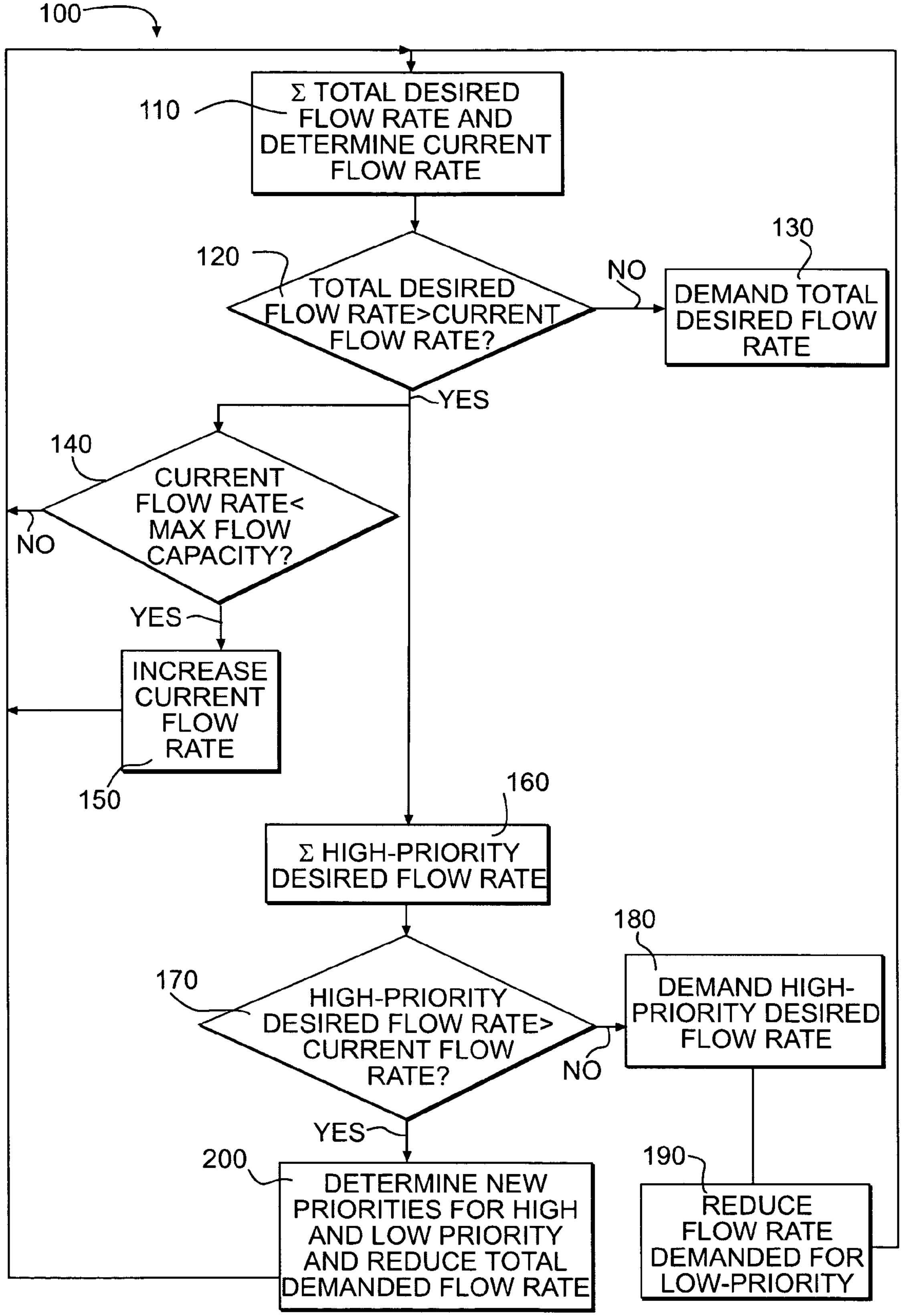
FIG. 3 is a flow chart depicting an exemplary disclosed method of operating the hydraulic system of FIG. 2.

FIG. 3 includes a flow chart 100 illustrating an exemplary operation of hydraulic system 26. Flow chart 100 will be discussed in detail in the following section.

INDUSTRIAL APPLICABILITY

The disclosed hydraulic system may be applicable to any work machine that includes a plurality of fluidly connected hydraulic actuators where flow sharing is desired to alleviate unpredictable and undesirable movements of the work machine. The disclosed hydraulic system may apportion a current flow rate of a source of pressurized fluid among the plurality of fluidly connected hydraulic actuators according to assigned priorities to ensure that some fluid flow is always available to each of the plurality of fluidly connected hydraulic actuators. In this manner, predictable operation of work machine 10 and/or work implement 14 may be maintained, while simultaneously providing greater responsiveness to particular operator-designated actuators after a desired priority. The operation of hydraulic system 26 will now be explained.

During operation of work machine 10, a work machine operator may manipulate first and/or second operator interface devices 22, 24 to create a desired movement of work machine 10. Throughout this manipulation process, first and second operator interface devices 22, 24 may generate signals indicative of desired flow rates of fluid supplied to hydraulic cylinders 32*a–c* and/or motor 34 that efficiently accomplish the desired movements. After receiving these signals, controller 50 may sum the total desired flow rate and determine the current flow rate of source 30 (Step 110).

Controller 50 may compare the total desired flow rate to the current flow rate of source 30 (step 120). If the total desired flow rate is less than the current flow rate of source 30, the total desired flow rate may be demanded by appropriately positioning the valve mechanisms of proportional control valves 44, 48 (step 130). However, if the total desired flow rate of source 30 is greater than the current flow rate of source 30, controller 50 may then determine if the current flow rate of source 30 is less than a predetermined maximum flow capacity of source 30 (step 140). If the total desired flow rate of source 30 is less than the predetermined maximum flow capacity, the current flow rate of pump 30 may be increased to within a predetermined range of the total desired flow rate (step 150).

Simultaneous to changing the operation of source 30, controller 50 may sum the desired flow rates for just the one(s) of hydraulic cylinders 32*a–c* and motor 34 designated by the work machine operator as a high-priority actuator (step 160) and compare the sum to the current flow rate (step 170). If the sum of the high-priority desired flow rates is less than the current flow rate of source 30, the high-priority desired flow rates may be demanded by appropriately positioning the valve mechanisms of proportional control valves 44 and/or 48 (step 180). After appropriating the desired flow rates for the high-priority actuators, controller 50 may then demand a flow rate for the low-priority actuators that is scaled down from the original flow rates according to the priorities assigned by, for example, the work machine operator, and appropriate the remaining flow rates accordingly (step 190). However, if the sum of the high-priority desired flow rates alone is greater than the current flow rate of source 30, controller 50 may determine new priorities for all of the originally designated high- and low-priority actuators and reduce the total demanded flow rate below the originally desired flow rate such that the total demanded flow rate does not exceed the current flow rate of source 30 (step 200).

After apportioning the current flow rate of source 30 among the high- and low-priority actuators, control may return to step 110 in anticipation of further manipulation of operator interface devices 22, 24.

It will be apparent to those skilled in the art that various modifications and variations can be made to the disclosed hydraulic system. Other embodiments will be apparent to those skilled in the art from consideration of the specification and practice of the disclosed hydraulic system. It is intended that the specification and examples be considered as exemplary only, with a true scope being indicated by the following claims and their equivalents.

What is claimed is:

1. A hydraulic system, comprising:
- a tank configured to hold a supply of fluid;
- a source configured to pressurize the fluid;
- a plurality of fluid actuators configured to receive the pressurized fluid; and
- a controller configured to:
  - receive an input indicative of which of the plurality of fluid actuators are a first type of fluid actuator and which of the plurality of fluid actuators are a second type of fluid actuator;
  - receive an input indicative of a desired flow rate for the plurality of fluid actuators;
  - determine a current flow rate of the source;
  - demand the desired flow rate for the first type of fluid actuator and demand a scaled down desired flow rate for the second type of fluid actuator when a total desired flow rate for the plurality of fluid actuators exceeds the current flow rate of the source; and
  - demand a scaled down desired flow rate for all of the plurality of fluid actuators when the desired flow rate for the first type of fluid actuator exceeds the current flow rate of the source.

2. The hydraulic system of claim 1, wherein the controller is configured to receive an input indicative of a priority for each of the second type of fluid actuators and to scale down the desired flow rate for the second type of fluid actuator according to the priority when the total desired flow rate for the plurality of fluid actuators exceeds the current flow rate of the source.

3. The hydraulic system of claim 1, wherein the controller is configured to determine a priority for each of the plurality of fluid actuators when the desired flow rate for the first type of fluid actuator exceeds the current flow rate of the source.

4. The hydraulic system of claim 3, wherein the priority for each of the first type of fluid actuator is the same.

5. The hydraulic system of claim 3, wherein the controller is configured to receive an input indicative of desired priorities for the second type of fluid actuator and the determined priorities are calculated based on the desired priorities.

6. The hydraulic system of claim 5, wherein the determined priorities for the first type of fluid actuator are greater than the determined priorities for the second type of fluid actuator.

7. The hydraulic system of claim 1, wherein the controller is further configured to adjust operation of the source when the current flow rate is not within a predetermined range of the desired flow rate.

8. The hydraulic system of claim 1, wherein the controller is further configured to increase the current flow rate of the source when the current flow rate is less than the desired flow rate and less than a predetermined maximum flow rate.

9. A method of operating a hydraulic system, comprising:
- pressurizing a fluid;
- selectively directing the pressurized fluid to a plurality of fluid actuators;
- receiving an input indicative of which of the plurality of fluid actuators are a first type of fluid actuator and which of the plurality of fluid actuators are a second type of fluid actuator;
- receiving an input indicative of a desired flow rate for the plurality of fluid actuators;
- determining a current flow rate of a source in fluid communication with the plurality of fluid actuators;
- demanding the desired flow rate for the first type of fluid actuator and demanding a scaled down desired flow rate for the second type of fluid actuator when a total desired flow rate for the plurality of fluid actuators exceeds the current flow rate of the source; and
- demanding a scaled down desired flow rate for all of the plurality of fluid actuators when the desired flow rate for the first type of fluid actuator exceeds the current flow rate of the source.

10. The method of claim 9, further including:
- receiving an input indicative of a desired priority for each of the second type of fluid actuator; and
- scaling down the demanded flow rates of the second type of fluid actuators according to the desired priority when the total demanded flow rate for the plurality of fluid actuators exceeds the current flow rate of the source.

11. The method of claim 9, further including determining a priority for each of the plurality of fluid actuators when the desired flow rate for the first type of fluid actuator exceeds the current flow rate of the source.

12. The method of claim 11, wherein the priority for each of the first type of fluid actuator is the same.

13. The method of claim 11, further including receiving an input indicative of desired priorities for the second type of fluid actuator, the determined priorities being calculated based on the desired priorities.

14. The hydraulic system of claim 13, wherein the determined priorities for the first type of fluid actuator are greater than the determined priorities for the second type of fluid actuators.

15. The method of claim 9, further including:
- determining a current flow rate of the source; and
- adjusting operation of the source when the current flow rate is not within a predetermined range of the desired flow rate.

16. The method of claim 15, further including increasing the current flow rate of the source when the current flow rate is less than the desired flow rate and less than a predetermined maximum flow rate.

17. A work machine, comprising:
- a power source;
- at least one work implement;
- at least one traction device; and
- a hydraulic system configured to actuate at least one of the at least one work implement and the at least one traction device, the hydraulic system including:
  - a tank configured to hold a supply of fluid;
  - a source configured to pressurize the fluid;
  - a plurality of fluid actuators configured to receive the pressurized fluid;
  - a controller configured to:
    - receive an input indicative of which of the plurality of fluid actuators are a first type of fluid actuator and which of the plurality of fluid actuators are a second type of fluid actuator;
    - receive an input indicative of a desired flow rate for the plurality of fluid actuators;

determine a current flow rate of the source, demand the desired flow rate for the first type of fluid actuator and to demand a scaled down desired flow rate for the second type of fluid actuator when a total desired flow rate for the plurality of fluid actuators exceeds the current flow rate of the source;

demand a scaled down desired flow rate for all of the plurality of fluid actuators when the desired flow rate for the first type of fluid actuator exceeds the current flow rate of the source; and adjust operation of the source when the current flow rate is not within a predetermined range of the desired flow rate.

18. The work machine of claim 17, wherein the controller is configured to receive an input indicative of a desired priority for each of the second type of fluid actuator and to scale down the desired flow rate for the second type of fluid actuator according to the desired priority when a total desired flow rate for the plurality of fluid actuators exceeds the current flow rate of the source.

19. The work machine of claim 17, wherein the controller is configured to receive an input indicative of desired priorities for the second type of fluid actuator and to determine a priority for each of the plurality of fluid actuators based on the input when the desired flow rate for the first type of fluid actuator exceeds the current flow rate of the source.

20. The work machine of claim 18, wherein the determined priority for each of the first type of fluid actuators is the same.

21. The work machine of claim 18, wherein the determined priorities for the first type of fluid actuators are greater than the determined priorities for the second type of fluid actuators.

22. The work machine of claim 17, wherein the controller is further configured to increase the current flow rate of the source when the current flow rate is less than the desired flow rate and less than a predetermined maximum flow rate.

23. A hydraulic system, comprising:

a tank configured to hold a supply of fluid;

a source configured to pressurize the fluid;

a plurality of fluid actuators configured to receive the pressurized fluid; and a controller configured to:

receive an input indicative of which of the plurality of fluid actuators are a first type of fluid actuator and which of the plurality of fluid actuators are a second type of fluid actuator;

receive an input indicative of a desired priority of the second type of fluid actuator;

receive an input indicative of a desired flow rate for the plurality of fluid actuators;

determine a current flow rate of the source; and demand the desired flow rate for the first type of fluid actuator and demand a scaled down desired flow rate for the second type of fluid actuator according to the desired priority when a total desired flow rate for the plurality of fluid actuators exceeds the current flow rate of the source.

24. The hydraulic system of claim 23, wherein the controller is configured to determine a priority for each of the plurality of fluid actuators when the desired flow rate for the first type of fluid actuator exceeds the current flow rate of the source.

25. The hydraulic system of claim 24, wherein the determined priorities for the second type of actuator are calculated based on the desired priorities.

26. A method of operating a hydraulic system, comprising:

pressurizing a fluid;

directing the pressurized fluid to a plurality of fluid actuators;

receiving an input indicative of which of the plurality of fluid actuators are a first type of fluid actuator and which of the plurality of fluid actuators are a second type of fluid actuator;

receiving an input indicative of a desired priority of the second type of fluid actuators;

receiving an input indicative of a desired flow rate for the plurality of fluid actuators;

determining a current flow rate of a source in fluid communication with the plurality of fluid actuators; and demanding the desired flow rate for the first type of fluid actuator and demanding a scaled down desired flow rate for the second type of fluid actuator according to the desired priority when a total desired flow rate for the plurality of fluid actuators exceeds the current flow rate of the source.

27. The method of claim 26, further including determining a priority for each of the plurality of fluid actuators when the desired flow rate for the first type of fluid actuator exceeds the current flow rate of the source.

28. The method of claim 27, wherein the determined priorities for the second type of fluid actuators are calculated based on the desired priorities.

29. A work machine, comprising:

a power source;

at least one work implement;

at least one traction device; and a hydraulic system configured to actuate at least one of the at least one work implement and the at least one traction device, the hydraulic system including:

a tank configured to hold a supply of fluid;

a source configured to pressurize the fluid;

a plurality of fluid actuators configured to receive the pressurized fluid;

a controller configured to:

receive an input indicative of which of the plurality of fluid actuators are a first type of fluid actuator and which of the plurality of fluid actuators are a second type of fluid actuator;

receive an input indicative of a desired priority for each of the second type of fluid actuators;

receive an input indicative of a desired flow rate for the plurality of fluid actuators;

determine a current flow rate of the source; and demand the desired flow rate for the first type of fluid actuator and demand a scaled down desired flow rate for the second type of fluid actuator according to the desired priority when a total desired flow rate for the plurality of fluid actuators exceeds the current flow rate of the source.

* * * * *